(12) United States Patent
Tsukamoto et al.

(10) Patent No.: US 6,283,239 B1
(45) Date of Patent: Sep. 4, 2001

(54) AUXILIARY BRAKE APPARATUS OF HYBRID AUTOMOBILE

(75) Inventors: Masahiro Tsukamoto; Tadayuki Hatsuda; Kouichiro Yonekura; Yoshio Shimoida, all of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/271,451

(22) Filed: Mar. 18, 1999

(30) Foreign Application Priority Data

Apr. 1, 1998 (JP) .................................................. 10-088941

(51) Int. Cl.[7] .................................................. B60K 6/04
(52) U.S. Cl. .......................................... 180/65.2; 305/152
(58) Field of Search ............................. 180/65.2; 310/77, 310/93; 303/52, 20

(56) References Cited

U.S. PATENT DOCUMENTS

| 5,476,310 | * | 12/1995 | Ohtsu et al. | 303/152 |
| 5,511,866 | * | 4/1996 | Terada et al. | 303/152 |
| 5,542,754 | * | 8/1996 | Aoki et al. | 303/152 |
| 5,775,784 | * | 7/1998 | Koga et al. | 303/152 |
| 5,788,597 | * | 8/1998 | Boll et al. | 180/65.2 |
| 5,839,533 | * | 11/1998 | Mikami et al. | 180/65.2 |
| 5,846,155 | * | 12/1998 | Taniguchi et al. | 180/65.2 |
| 5,934,396 | * | 8/1999 | Kurita | 180/65.2 |
| 5,984,034 | * | 11/1999 | Morisawa et al. | 180/65.2 |
| 6,026,921 | * | 2/2000 | Aoyama et al. | 180/65.2 |
| 6,041,877 | * | 3/2000 | Yamada et al. | 180/65.2 |
| 6,062,657 | * | 5/2000 | Dimasi | 303/122.13 |

FOREIGN PATENT DOCUMENTS 9-117008   5/1997 (JP) .
9-272423  10/1997 (JP) .

* cited by examiner

*Primary Examiner*—Douglas Hess
*Assistant Examiner*—Elaine Gort
(74) *Attorney, Agent, or Firm*—McDermott, Will & Emery

(57) ABSTRACT

A disclosed auxiliary brake apparatus of a hybrid automobile includes a braking detector for detecting an operation of braking the hybrid automobile, an auxiliary brake electric motor capable of braking the hybrid automobile, and an auxiliary brake controller capable of controlling the auxiliary brake electric motor. The auxiliary brake controller controls the auxiliary brake electric motor to generate a counter torque in the auxiliary brake electric motor to thereby brake the hybrid automobile in accordance with the operation of braking the hybrid automobile detected by the braking detector when the controller determines that a failure occurs to the electric powered brake of the hybrid automobile.

18 Claims, 3 Drawing Sheets

AUXILIARY BRAKE APPARATUS OF HYBRID AUTOMOBILE

BACKGROUND OF THE INVENTION

The present invention relates to an auxiliary brake apparatus of a hybrid automobile and relates to, in particular, an auxiliary brake apparatus of a hybrid automobile capable of applying a braking force to wheels in an auxiliary manner in accordance with braking operation in case that an electric powered brake, generating the braking force to wheels, fails.

Conventionally, a hybrid automobile including an engine and an electric motor is normally provided with an electric powered brake which is electrically driven.

More specifically, the electric powered brake has a structure in which an electric motor rotates, the rotation is converted to the rotation of a screw nut so as to be slowed down, the screw nut is directed straight to push brake pads against disks to thereby generate braking forces and brake wheels, in accordance with treading on a brake pedal.

In addition, Japanese Patent Application Laid-Open No. 9-272423 discloses a brake control actuator in which a pressure generated while treading on a brake pedal is applied through a hydraulic piping to thereby transmit braking forces to wheels so as to push brake pads against wheel sides, as a countermeasure against a failure to such as an electric powered brake.

SUMMARY OF THE INVENTION

When a hydraulic piping as well as an electric powered brake is provided to a hybrid automobile as shown in the conventional case, however, it is necessary to install a hydraulic piping which has to be handled while keeping high rigidity, a master cylinder of by no means small size and by no means light-weight or the like although they are, in effect, not needed in a normal operation. This limits the degree of freedom for design and layout and hampers demand for cost reduction, realizing a light-weight system or the like.

That is, there is unavoidably a certain limit, as a countermeasure against a case where a electric powered brake fails in a hybrid automobile, to ensuring the degree of freedom for design and layout, realizing cost reduction and a light-weight system or the like only by providing a structure for adding an ordinary hydraulic brake system. Demand for realizing an auxiliary brake apparatus of a hybrid automobile based on a novel design concept is, therefore, being voiced.

The present invention has been made in these circumstances and its object is to provide an auxiliary brake apparatus of a hybrid automobile ensuring reliability while the apparatus is being operated, provided with a high degree of freedom for design, and realizing cost reduction and light-weight.

An auxiliary brake apparatus of a hybrid automobile according to the present invention is appropriately applied to a hybrid automobile comprising an engine capable of driving the hybrid automobile, an electric motor capable of driving the hybrid automobile, an electric powered brake for braking the hybrid automobile and a controller capable of controlling driving by the engine, driving by the electric motor and braking by the electric powered brake. The auxiliary brake apparatus of the hybrid automobile comprises a braking detector for detecting an operation of braking the hybrid automobile, an auxiliary brake electric motor capable of braking the hybrid automobile and an auxiliary brake controller capable of controlling the auxiliary brake electric motor. In this case, when judging that the electric powered brake fails, the auxiliary brake controller controls the auxiliary brake electric motor such that a counter torque occurs to the auxiliary brake electric motor to thereby brake the hybrid automobile in accordance with the operation of braking the hybrid automobile detected by the braking detector.

DESCRIPTION OF THE PREFERRED EMBODIMENT

The embodiment according to the present invention will now be described in detail with reference to the accompanying drawings.

First, description will be given to the constitution of a hybrid automobile A to which an auxiliary brake apparatus in the embodiment is applied.

Figure 1:
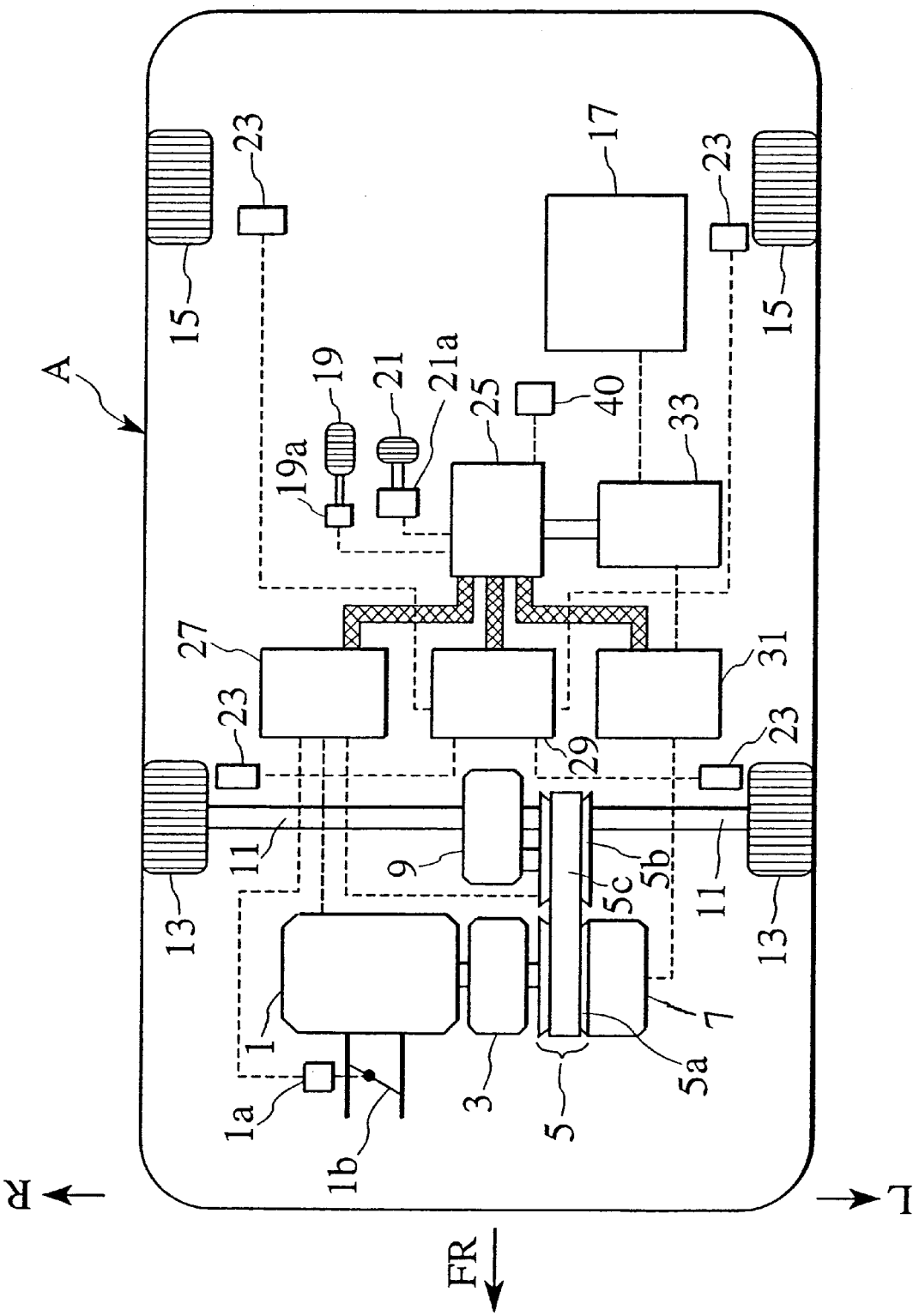
FIG. 1 shows the overall constitution of a hybrid automobile to which an auxiliary brake apparatus in one embodiment according to the present invention can be applied.

In FIG. 1, an engine 1 is provided to obtain a main driving force for running the hybrid automobile A by igniting fuel such as gasoline. The engine 1 is arranged on an automobile front side.

An electric throttle 1a is attached to the engine 1. The electric throttle 1a actuates when a driver accelerates the automobile A by means of an accelerator pedal 19, and adjusts the quantity of air supplied to the engine 1 by opening and closing a throttle valve 1b. The electric throttle 1a may be replaced by a mechanical throttle which is pulled by a wire and is thereby opened and closed. Since the hybrid automobile A is provided with an assist electric motor 7 for assisting in a driving force to be described later, the electric motor 7 is provided in this embodiment to cooperate its motor driving force with the engine driving force of the engine 1.

There is provided an ordinary torque converter 3 to transmit the driving force of the engine 1 to the next element through a fluid.

A transmission 5 is provided to change the driving force transmitted through the torque converter 3 from the engine 1 and transmits the changed driving force to wheels. The transmission is a belt-type auxiliary transmission (such as a CVT or continuously variable transmission). A belt 5c is hooked between an input-side pulley 5a and an output-side pulley 5b and diameters of the both pulleys are changed to thereby realize continuously variable non-stage transmission.

The assist electric motor 7 is provided to be directly coupled to the input-side pulley 5a of the transmission 5 and serves to assist in the driving force when the efficiency of the engine 1 is low to thereby reduce the fuel consumption of the engine 1, and to convert the kinetic energy of the hybrid automobile A to an electric energy and retrieves the electric energy while decelerating the automobile A.

Here, the assist electric motor 7 can be provided, for example, between a driving wheel 13 and the torque converter 3 so that the motor 7 is directly connected to the output-side pulley 5b, a differential gear 9, each of right and left drive shafts 11 or each of the driving wheels 13. Specifically, the motor 7 may be arranged between the transmission 5 and the differential gear 9, or between the differential gear 9 and at least the right and left drive wheels 13 of wheels. When the electric motor 7 is used to apply a braking force while an electric powered brake to be described later fails, in such a view, the motor 7 may be provided to at least one of the front, rear and right and left wheels 13, 15. Needless to say, when the motor 7 is rotated integrally with the driving wheels such as, for example, when the torque converter 3 includes a lock-up mechanism or an electromagnetic clutch instead of the torque converter 3 is used, then the motor 7 can be provided between the mechanism or the clutch and the engine 1 or provided integrally with the engine 1 main body. Namely, in that case, the electric motor 7 suffices when it is provided between the output shaft of the engine 1 and the transmission 5 and provided in a region rotatable integrally with the input shaft of the transmission 5.

In this embodiment, the assist electric motor 7 is directly connected to the input-side pulley 5a of the transmission 5, so that the transmission 5 acts on the output of the assist electric motor 7. Due to this, it is possible to obtain a high braking torque and driving torque with a small-size, high-speed, low torque type motor. When the motor 7 is provided between the output-side pulley 5b and the driving wheel 13, the transmission gear ratio of the transmission 5 can be determined only based on the driving force and braking force of the engine 1. Besides, when the assist electric motor 7 is closer to the driving wheel 13, a friction-induced loss is reduced to thereby make it possible to improve efficiency in driving operation and regenerative operation.

The differential gear 9 transmits the output of the transmission 5 to the left and right drive shafts 11 and corrects the difference in rotation speed between the left and right driving wheels 13 during rotation. The left and right drive shafts 11 connect the differential gear 9 with the corresponding left and right drive wheels 13.

A battery 17 is a power supply to drive the assist electric motor 7 and stores power regenerated in the assist electric motor 7. The battery 17 is appropriately charged by a generator (not shown) driven by the engine 1 during the rotation of the engine 1.

A brake actuator 23 is attached to four wheels, i.e., the two driving wheels 13 and two trailing wheels 15. The actuator 23 actuates in accordance with the driver's treading on the brake pedal 21 and brakes the driving wheels 13 and the trailing wheels 15, respectively by use of friction. In this embodiment, the battery connected to the assist electric motor 7 is the same as that connected to the brake actuator 23, that is, a common battery 17 is provided. In view of further improving the reliability of braking operation, the motor 7 and the actuator 23 may be connected to different batteries, independently of each other.

An accelerator pedal 19 and the brake pedal 21 are operated by a driver. Operation information detected by an accelerator pedal sensor 19a and that detected by a brake pedal sensor 21a are sent to a driving controller 25.

The driving controller 25 manages an engine controller 27, a brake controller 29, a motor controller 31 and a battery controller 33. The controller 25 reads-various information sent through the controllers 27, 29,31 and 33 and that directly sent from the accelerator pedal sensor 19a, brake pedal sensor 21a and various sensors (not shown), and detects the driving state of the hybrid automobile A. In accordance with various control purposes, if, for example, the engine 1, the brake actuator 23, the assist electric motor 7 and the battery 17 are to be controlled, the driving controller 25 transmits control commands to the engine 1, brake actuator 23, assist electric motor 7 and battery 17 through the corresponding controllers 27, 29, 31 and 33, respectively.

The controllers 27, 29, 31 and 33 control the engine 1 and the like to realize the control commands thus outputted. Specifically, the engine controller 27 controls the aperture degree of the throttle valve 1b of the electric throttle 1a, the ignition timing and fuel oil consumption of the engine 1 and the transmission gear ratio of the transmission 5 so as to realize the given driving force. The brake controller 29 controls the brake actuator 23 so as to generate the given braking force. At this moment, the braking force is determined while considering the ratio of distributing the braking force to the front, rear, right and left wheels, that is, the driving wheels 13 and the trailing wheels 15, and considering the slipping states thereof. The motor controller 31 controls current supplied to the electric motor 7 so as to generate the given driving force and braking force. The battery controller 33 controls the battery 17 so as to charge and discharge the battery 17 in accordance with the given charge/discharge commands.

Though, in this embodiment, the power is supplied to various actuators such as an actuator for the electric throttle 1a and the like by the battery 17, it is assumed that the power is supplied to the various actuators by a battery (not shown) which is different from the battery 17. The provision of the different battery (not shown) is to prevent both the various actuators and the electric motor 7 from being simultaneously inoperable even when the battery 17 is inoperable due to the expiration of its service life.

Next, with reference to FIG. 1, and when necessary, promptly to the flow chart shown in FIG. 2, description will be given to the processing of the driving controller 25 in normal operation. The driving controller 25 starts processing when an ignition is turned on and repeatedly performs all series of the processing from start to end with a predetermined time interval.

In a step S101, the driving controller 25 obtains to read pedal information $I_P$ detected by the accelerator pedal sensor 19a of the accelerator pedal 19 and the brake pedal sensor 21a of the brake pedal 21. More specifically, the accelerator pedal sensor 19a detects pedal information $I_{PA}$ and the brake pedal 21a information detects pedal information $I_{PB}$.

Next in a step S103, information $I_D$ as to the driving state of the hybrid automobile A, such as a current vehicle speed $I_{DV}$ and a driving torque $I_{DT}$, is detected and read into the driving controller 25. Each of the driving wheels 13 is provided with a vehicle speed detector (not shown) for detecting the vehicle speed by generating a pulse signal in accordance with the rotation of the wheel, and the engine 1 is provided with a torque detector (not shown) for detecting the driving torque.

In a step S105, the driving controller 25 reads information $I_C$ from the engine controller 27, the brake controller 29, the motor controller 31 and the battery controller 33. Specifically, the controller 25 reads information $I_{CE}$ from the engine controller 27, information $I_{CBR}$ from the brake controller 29, information $I_{CM}$ from the motor controller 31 and information $I_{CBA}$ from the battery controller 33. The information relates to states of the actuators managed by the controllers 27, 29, 31 and 33, respectively, that is, to control states and the presence/absence of failure.

After reading the information, the driving controller 25 determines whether or not a failure occurs depending on whether or not the given control quantity is attained in a step S107. In case of determining the occurrence of the failure with respect to the brake actuator 23, for example, the controller 25 determines whether or not the actuator 23 fails depending on whether or not the given force to press the brake pad is obtained as commanded. A case where a failure occurs will be described later on.

When it is determined that no failure occurs in the step S107, the driving controller 25 determines whether to drive or brake the automobile A in a step S109 based on the pedal information $I_P$. In this case, the controller 25 determines to drive the automobile A if only the accelerator pedal 19 is treaded on and to brake the automobile A if only the brake pedal 21 is treaded on. If neither of the accelerator pedal 19 nor the brake pedal 21 is treaded on, it is determined to drive the automobile A with a target value set at zero. Meanwhile, if both of the accelerator pedal 19 and the brake pedal 21 are treaded on, it is determined to brake the automobile A, with the result that the vehicle speed is slowed down.

When it is determined to drive the automobile A in the step S109, a target value $D_T$ for the driving force is calculated in accordance with the degree of treading on the accelerator pedal 19 in a step S111.

Based on the target value $D_T$ obtained in the step S111, driving forces $D_E$ and $D_M$ of the engine 1 and the electric motor 7, respectively, are calculated to appropriately distribute the driving force to the engine 1 and the electric motor 7 in a step 113. At this time, when the hybrid automobile A is in a normal state, the driving force is shared so that the electric motor 7 generates a largest driving force as the battery 17 permits and the fuel consumption of the engine 1 is suppressed to a minimum. Thus, based on the information $I_{CBA}$ from the battery controller 33, the driving force is shared so as to meet the demand while taking the rotation speed of the engine 1, the rotation speed of the motor 7 and the like into account.

Next, in a step S115, an optimum transmission gear ratio $R_O$ is calculated to divide the driving force to the engine 1 as the driving force $D_E$ and to the electric motor 7 as the driving force $D_M$. When the non-stage transmission is used as shown in this embodiment, a transmission gear ratio can be freely determined. When a stage transmission is used, a transmission gear ratio closest to the determined transmission gear ratio is selected.

Finally, in a step S123, commands C corresponding to the respective controllers 27, 29, 31 and 33 are outputted. Specifically, as required, a command $C_E$ is issued to the engine controller 27, a command $C_{BR}$ to the brake controller 29, a command $C_M$ to the motor controller 31 and a command $C_{BA}$ to the battery controller 33.

When it is determined to brake the automobile A in the step S109, a braking force target value $B_T$ is calculated in accordance with the degree of treading on the brake pedal 21 in a step S117.

In a step S119, the braking force target value $B_T$ is distributed to the engine 1, the electric motor 7 and the brake actuator 23, and their corresponding braking forces $B_E$, $B_M$ and $B_B$ are calculated, respectively. In case of the hybrid automobile A in a normal state, the kinetic energy is converted or regenerated to the electric energy to a maximum as the battery 17 permits, and the resultant electric energy is stored in the battery 17. That is, the braking force is distributed such that the braking force of the engine brake and that of the brake actuator 23 are reduced as much as possible based on the information $I_{CBA}$ from the battery controller 33, and such that the braking force by the regenerative operation of the electric motor 7 is increased.

Next, in a step S121, an optimum transmission gear ratio $R'_O$ is calculated as in the case where it is determined to drive the automobile A in the step S109. In a step S123, commands are outputted to the controllers 27, 29, 31 and 33, respectively.

Figure 2:
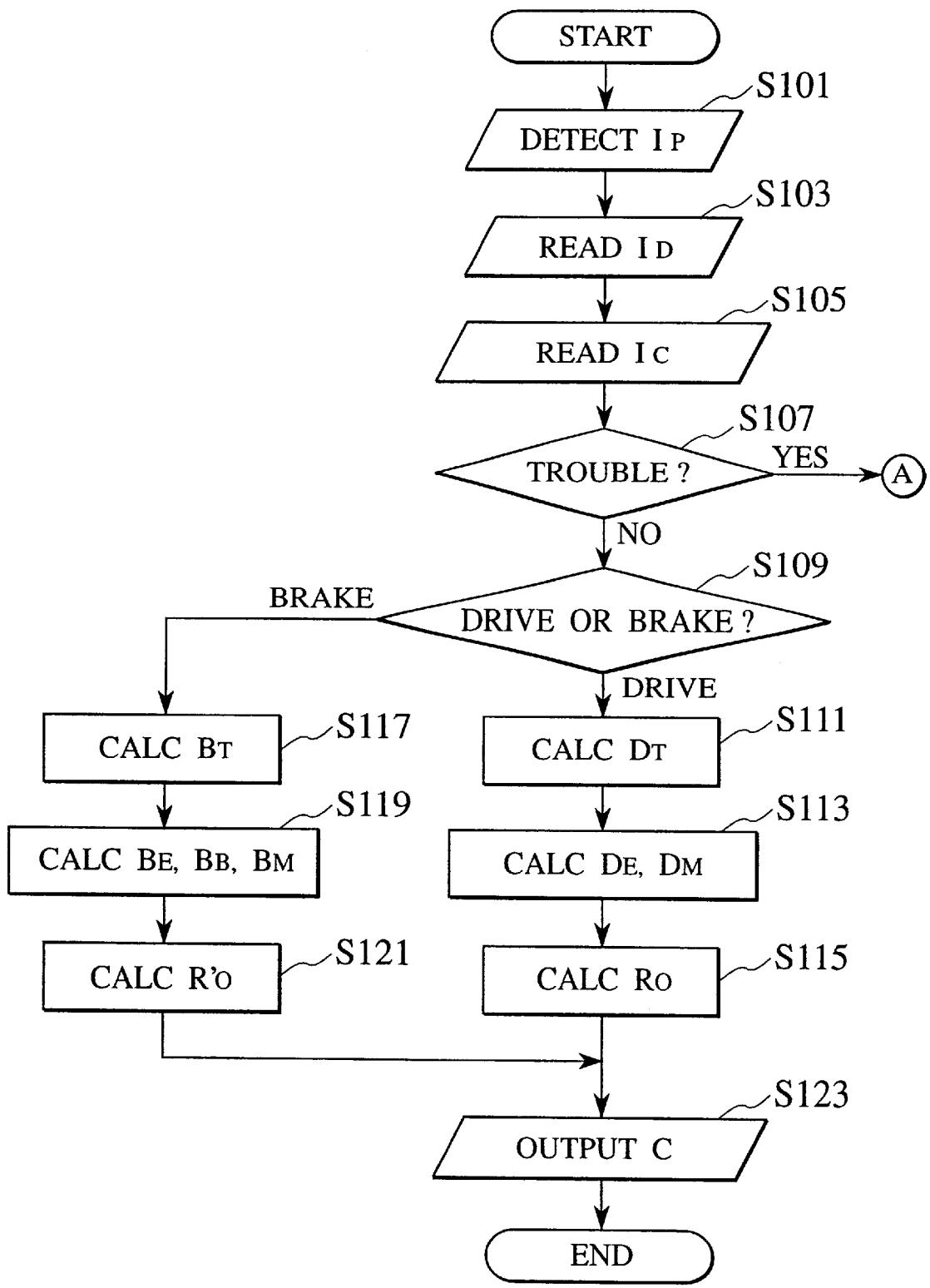
FIG. 2 is a flow chart showing the processing of a driving controller 25 in a normal operation in the embodiment according to the present invention.
Figure 3:
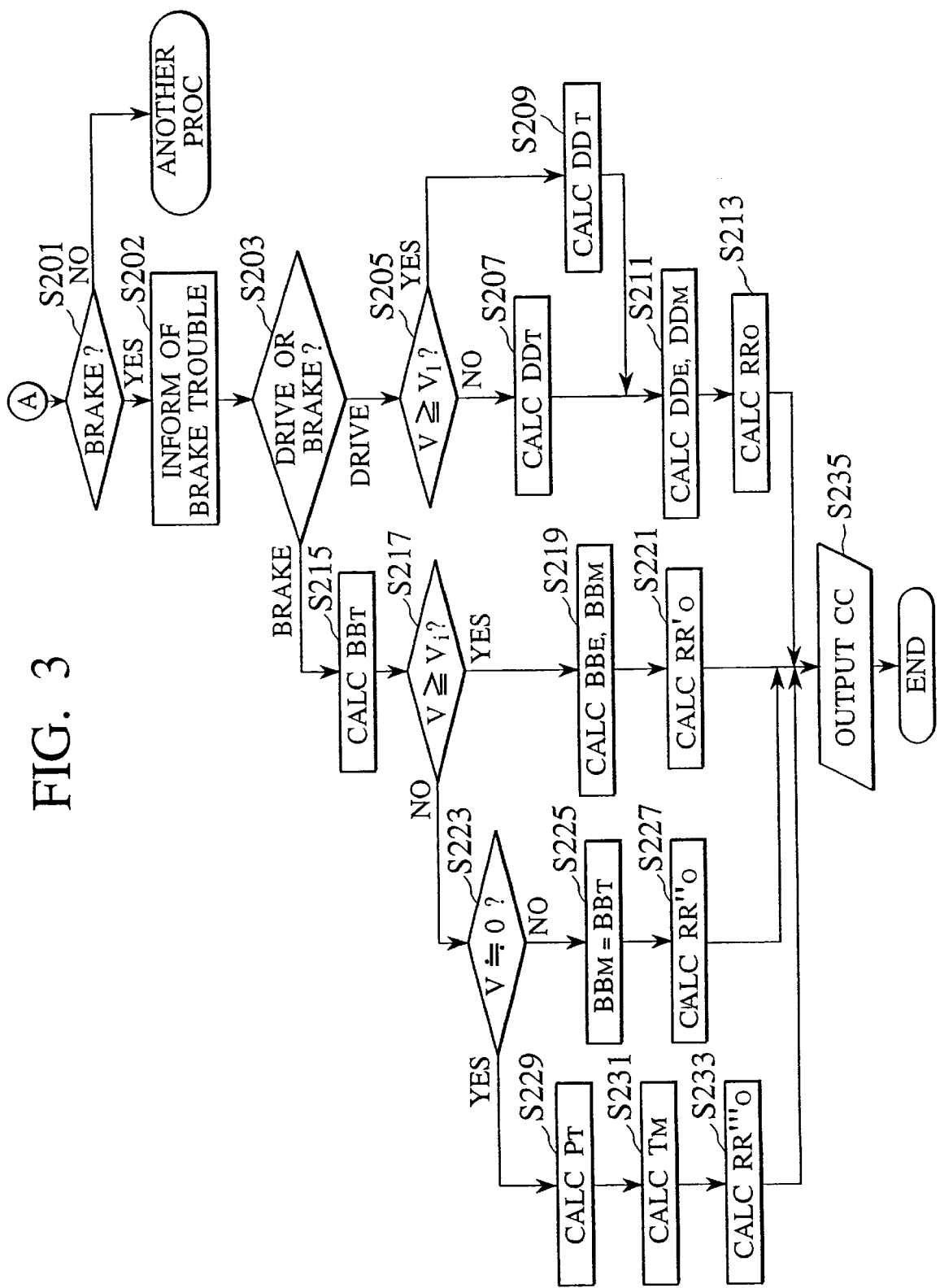
FIG. 3 is a flow chart showing the processing of the driving controller 25 in a failure operation in the embodiment according to the present invention.

In the flow chart shown in FIG. 2, when a failure is detected in the step S107, processing moves to steps in the flow chart shown in FIG. 3.

First, in a step S201, the driving controller 25 determines whether or not a failure occurs with respect to the brake actuator 23.

When the failure does not occur to the brake actuator 23 but, for example, the electric throttle 1a or the assist electric motor 7 fails, another processing is performed. Such a processing is disclosed by, for example, Japanese Patent Application Laid-Open No. 9-117008.

When the brake actuator 23 fails, the driver is informed of the occurrence of this failure by an alarm lamp or alarm sound from an alarm unit 40 in a step S202. As a result, the driver can recognize the failure of the brake actuator 23 and further recognizes a state in which an auxiliary brake is ready.

In a step S203, it is determined whether to drive or to brake the automobile A. The determination is the same as in the normal operation shown in the step S109.

When it is determined to drive the automobile A in a step S203, it is determined whether or not the current vehicle speed v is not less than a predetermined limiting speed $V_1$ in a step S205. It is noted that the predetermined limiting speed $V_1$ is set as a countermeasure against a case where braking performance is changed as a result of the failure of the braking actuator 23. For instance, a limiting speed is set at 60 km/h, which is slightly faster than the highway minimum speed of 50 km/h, to prevent the automobile A from gaining speed further. This feature reduces the cases of having to suddenly operate the brake system, as well as the feeling of physical disorder accompanied with the change of braking performance. In addition to this, it can act as a caution alert for the driver. When the feeling of physical disorder does not arise due to braking control to be described later, such as a limitation of the highest speed to the limiting speed is not required.

Next, when it is determined that the current vehicle speed is below the limiting speed $V_1$ in a step S205, a driving force target value $DD_T$ is calculated in the same manner as in normal operation in a step S207 and processing goes on to a step S211.

When it is determined that the current vehicle speed is equal to or exceeds the limiting speed $V_1$ in the step S205, the driving controller 25 calculates a driving force necessary to maintain the limiting speed $V_1$ as a driving force target value $DD'_T$ in a step S209.

Based on the target value $DD_T$ obtained in the step S207 or the target value $DD'_T$ obtained in the step S209, driving forces $DD_E$ and $DD_M$ are calculated in a step S211 to appropriately distribute the driving force to the engine 1 and the electric motor 7. At this moment, when the automobile A is in normal operation as described above, the driving force is distributed as preferentially as possible to the electric motor 7 in an effort to reduce fuel consumption. When the brake actuator 23 fails, on the other hand, it is necessary to control the battery 17 such that the battery 17 can be always charged or discharged to stop the automobile A using the electric motor 7 to be described later. Hence, in this embodiment, the driving force is distributed to the electric motor 7 so that the battery 17 is in a charged state in the middle of its full charged state and its vacant state.

A later step S213 and the following are the same as in the normal operation in the steps S115 and the following already stated above.

That is, in the step S213, to distribute the driving force to the engine 1 as the driving force $DD_E$ and to the electric motor 7 as the driving force $DD_M$, an optimum transmission gear rate $RR_O$ is determined.

Finally in a step S235, commands CC corresponding to the respective controllers 27, 29, 31 and 33 are outputted. Specifically, as required, a command $CC_E$ is outputted to the engine controller 27, a command $CC_{BR}$ to the brake controller 29, a command $CC_M$ to the motor controller 31 and a command $CC_{BA}$ to the battery controller 33.

Meanwhile, when it is determined to brake the automobile A in the step S203, a braking force target value $BB_T$ is calculated according to the degree of treading on the brake pedal 21 in a step S215.

In a step S217, it is determined whether or not the current vehicle speed v is not less than the idle vehicle speed vi while the automobile is running with the engine 1 in an idle rotation state.

When it is determined that the current speed v is equal to or faster than the idle speed $v_i$, the braking force is distributed to the engine 1 and the electric motor 7 so as to attain the target braking force $BB_T$ while taking it into account that the engine brake can be efficiently operated, and braking forces $BB_E$ and $BB_M$ for the engine 1 and the motor 7, respectively, are calculated in a step S219. In normal operation, the braking force is regenerated in the electric motor 7 so that the kinetic energy is converted to the electric energy as much as possible. However, as stated above, it is necessary to control the battery 17 such that the battery 17 can be always charged or discharged and the braking force distribution is determined so as to mainly use the engine brake. For that reason, a braking force which can be generated in the engine 1 at the time of fully closing the electric throttle 1a and stopping fuel injection is set as the braking force of the engine 1. When the braking force of the engine 1 is insufficient, a braking force generated by the regenerative operation of the electric motor 7 is used to compensate for the insufficient braking force and the regeneration keeps continuing till the end of braking operation. When considering a case of braking the automobile A even by use of the electric motor 7, an optimum battery state of the battery 17 is that in which the battery 17 is fully charged when the hybrid automobile A is stopped and the regeneration-induced braking power is unnecessary. Thus, by adjusting the degree of the regeneration and that of actual compensation according to the vehicle speed, it is possible to make the battery 17 closer to such an optimum state.

In a step S221, an optimum transmission gear rate $RR'_O$ is calculated as in the case of the step S203 in which it is determined to drive the automobile A. In the step S235, corresponding commands are outputted to the respective controllers 27, 29, 31 and 33. Specifically, in the step S221, when a braking force is below the target braking force $BB_T$, the transmission gear ratio is gradually shifted to LOW side and an optimum transmission gear ratio $RR'_O$ is calculated to increase the rotation speed of the engine to thereby increase the braking force. When the electric motor 7 is attached to each of the left and right driving wheels 13 and the electric powered brake fails, only the driving wheels 13 become braked wheels and a braking force is generated. With such a structure, therefore, by calculating the difference in rotation speed between the braked driving wheels 13 and the trailing wheels 15, the slipping state of the braked wheels, i.e., driving wheels 13 can be detected. Thus, when there is the rotation speed difference between the driving wheels 13 and the trailing wheels 15, a target braking force is reduced to stop a slip, that is, anti-skid control can be easily made and the reliability of braking operation can be thereby enhanced.

Meanwhile, when it is determined that the current vehicle speed v is below the idle vehicle speed $v_i$ in the step S217, it is determined whether or not the speed v is in the vicinity of zero in a step S223.

When the current vehicle v is not in the vicinity of zero, the engine brake is not able to be put on. In a step S225, the braking force $BB'_M$ of the electric motor 7 is set to the braking force target value $BB_T$ calculated in the step S215. Here, when the vehicle speed is equal to or lower than a certain speed, the electric motor 7 cannot be regenerated and the energy consumption starts at the electric motor 7. In case of the hybrid automobile A in normal operation, the braking by the electric motor 7 may be stopped and that by the brake actuator 23 may be started. When the brake actuator 23 fails as concerned herein, braking by the electric motor 7 continues while the power of battery 17 is being consumed.

Next, in a step S227, since the hybrid automobile A almost reaches its stopped state, by the driving controller 25, an optimum transmission gear ratio $RR''_O$ is calculated so as to make the transmission gear ratio gradually closest to the LOW side.

When it is determined that the current vehicle speed v is in the vicinity of zero in the step S223, in a step S229, a target stop position $P_T$ is calculated so that the hybrid automobile A is stopped as in the case of normally putting on the brake system.

In this case, the position of the hybrid automobile A is measured by using a rotation pulse signal detected by a vehicle speed sensor (not shown) attached to the wheels and/or a pulse signal onal position sensor (not shown) to detect the rotating position of the rotor of the electric motor 7.

More specifically, when the pulse number of a pulse signal from the vehicle speed sensor is used, it is possible to set the target stop position $P_T$ which directly reflects the movement of the hybrid automobile A. In other words, positions of the wheels 13 and 15 can be made direct correspondent to the target stop position $P_T$. When the pulse number from the rotational position sensor is used, high resolution, high accuracy control can be made. In either case, the target stop position $P_T$ is determined based on the current pulse number as a basis. Moreover, the calculation for determining the target stop position $P_T$ first time differs from the later calculation of the target stop position $P_T$. In the first calculation, a pulse position moved back from the current pulse position by a predetermined pulse width (which is, for example, corresponding to 5 pulses) is set as the target pulse position corresponding to the target stop position $P_T$. In second and the following calculations, when the current pulse position is at out side of the target pulse position±the pulse width (for example, ±5 pulses), the target pulse position is corrected and updated so that the current pulse position closely falls within ± the pulse width. When the current pulse position is not at out side, the target pulse position remains unchanged. For Instance, given the current pulse position at a zero pulse position and progressing in +direction, the target pulse position is set at a position of −5 pulse. Thereafter, when the pulse position progresses to sequentially shift to +3→+5→+6 pulse position, the target pulse position is updated to −2→0→1 pulse position accordingly. And when the hybrid automobile A stops once and finally swings back to +5 pulse position, the target pulse position remains at the 1 pulse position.

In a step S231, the counter torque $T_M$ of the electric motor 7 necessary to stop the automobile A at the target stop position $P_T$ is calculated. Specifically, in order to calculate the counter torque $T_M$, the pulse number by which the current pulse position is deviated from the target pulse position may be multiplied by a proportional constant. In other words, when the current pulse position is deviated by the pulse width (for example, corresponding to 5 pulses) as stated above, a proportional constant may be set such that the counter torque $T_M$ of the electric motor 7 is equal to the braking force target value $BB_T$ calculated in the step S215. When the target stop position $P_T$ and the counter torque $T_M$ of the electric motor 7 are set associated with each other in such a way, it is possible to make the maximum of the generated braking force corresponding to the braking force target value $BB_T$.

That is to say, in the positional control stated above, a target braking torque is calculated based on braking operation, and also a torque corresponding to that in order to return the current position of the hybrid automobile A to its target position is calculated in proportion to the difference between the target position and the current position. When the latter torque exceeds the target braking torque, the target position is updated closer to the current position so that both of the later torque and the target torque coincide with each other.

Hence, when the control of the electric motor 7 is changed over from the torque control to the positional control based on the position, no sudden torque variation occurs and the vehicle does not swing. As a result, the automobile A can be stopped in the same manner as by the normal electric powered brake system.

When the degree of treading on the brake pedal 21 is weaken, a creep phenomenon normally occurs. Since the maximum braking force generated coincides with the braking force target value $BB_T$ and the value $BB_T$ reflects the degree of treading on the brake pedal 21, it is possible to generate the same creep state as in the normal operation. Moreover, if the hybrid automobile A accidentally creeps, the driver normally treads on the brake pedal 21 harder. Due to the fact that the target pulse position for positional control is sequentially updated to follow the current position, when the degree of treading on the pedal increases, the hybrid automobile A can be stopped gently in the vicinity of the target position and, when necessary, continue to be stopped at that position. Thus, the driver does not have the feeling that braking performance may have been altered.

As a result of the above-stated positional control, it is possible to stop and keep stopping the hybrid automobile A as in the case of using the normal brake actuator 23.

Next, in a step S233, the driving controller 25 calculates an optimum transmission gear ratio $R'''_O$. In this case, the hybrid automobile A is almost in a stopped state and a transmission gear ratio is, therefore, set closest to the LOW.

Finally, in the step S235, commands are outputted to the controllers 27, 29, 31 and 33, respectively.

As stated so far, according to the driving controller 25, as particularly shown in FIG. 3, in this embodiment, the hybrid automobile A is first decelerated using the engine brake of the engine 1 and the regenerative operation of the electric motor 7, the driving state is next controlled to generate the counter torque in the electric motor 7 to thereby decelerate the hybrid automobile A, and then the hybrid automobile A is stopped at the target stop position previously determined, as if the hybrid automobile A is fixed to the target stop position by the electric motor 7. Through the three procedures, the hybrid automobile A can be stopped as in the normal operation without using the brake actuator 23.

Consequently, there is no need to provide the brake actuator 23 per se with a mechanical auxiliary mechanism in consideration of its potential failure. It is, thus, possible to realize a light-weight, low cost, highly reliable brake system.

In this embodiment, a method of controlling the electric motor 7 to finally stop the hybrid automobile A may be to control its speed. The speed is, however, obtained corresponding to intervals of pulse signals generated in response to the rotation of the wheels, and it is difficult to accurately detect the speed at an extremely low speed at which pulse signals are generated at greatly long intervals. It is, therefore, preferable that the position control capable of accurately retaining the stop state of the hybrid automobile A is adopted.

The entire contents of a Patent Application No. TOKUGANHEI 10-88941, with a filling date of Apr. 1, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An auxiliary brake apparatus of a hybrid automobile, said hybrid automobile comprising an engine capable of driving said hybrid automobile, an electric motor capable of driving said hybrid automobile, an electric powered brake for braking said hybrid automobile and a controller capable of controlling driving by said engine, driving by said electric motor and braking by said electric powered brake, said auxiliary brake apparatus comprising:

a braking detector detecting an operation of braking said hybrid automobile;

an auxiliary brake electric motor capable of braking said hybrid automobile, said electric motor being said auxiliary brake electric motor; and an auxiliary brake controller capable of controlling said auxiliary brake electric motor, said auxiliary brake controller controlling said auxiliary brake electric motor so as to generate a counter torque in said auxiliary braking electric motor to thereby control said hybrid automobile in accordance with said operation of braking detected by said braking detector when said auxiliary brake controller determines that said electric powered brake fails.

2. The auxiliary brake apparatus of a hybrid automobile according to claim 1, wherein said controller capable of controlling said driving by said engine, said driving by said motor and said braking by said electric motor is the same as said auxiliary brake controller.

3. The auxiliary brake apparatus of a hybrid automobile according to claim 2, wherein said controller controls said electric motor to put a rotor position of said electric motor at a target position when a speed of said hybrid automobile is below a predetermined value.

4. The auxiliary brake apparatus of a hybrid automobile according to claim 3, wherein said target position is away from a current rotor position of said electric motor by a predetermined distance, and said target position is updated to maintain said predetermined distance.

5. The auxiliary brake apparatus of a hybrid automobile according to claim 2, wherein said controller controls said electric motor to put a position of said wheel of said hybrid automobile at a target position when a speed of said hybrid automobile is below a predetermined value.

6. The auxiliary brake apparatus of a hybrid automobile according to claim 5, wherein said target position is displaced from a current position of said wheel by a predetermined distance, and said target position is updated to maintained said predetermined distance.

7. The auxiliary brake apparatus of a hybrid automobile according to claim 2, wherein said controller calculates a braking force target value based on said operation of braking detected by said braking detector, and calculates a torque of said electric motor so as to generate said counter torque in proportion to a difference between a target position and a current position of said hybrid automobile and so as to make said current position correspondent to said target position.

8. The auxiliary brake apparatus of a hybrid automobile according to claim 7, wherein a maximum of said counter torque corresponds to said braking force target value.

9. The auxiliary brake apparatus of a hybrid automobile according to claim 2, wherein said controller calculates a braking force target value in accordance with said braking operation detected by said braking detector, and distributes a braking force to a braking force of said engine and to a braking force of said electric motor so that a battery of said hybrid automobile can be always kept in a chargeable and dischargeable state when a speed of said hybrid automobile is equal to or higher than a predetermined value.

10. The auxiliary brake apparatus of a hybrid automobile according to claim 9, wherein an optimum state of said battery is fully charged when said hybrid automobile is stopped and regeneration-induced braking by said electric motor is unnecessary.

11. The auxiliary brake apparatus of a hybrid automobile according to claim 2, wherein said controller decrease a braking force target value when there is a difference between a rotation speed of a braked wheel of said hybrid automobile and a rotation speed of a non-braked wheel thereof.

12. The auxiliary brake apparatus of a hybrid automobile according to claim 1, wherein said hybrid automobile is provided with a transmission and said electric motor is provided between said engine and said transmission.

13. The auxiliary brake apparatus of a hybrid automobile according to claim 1, wherein said hybrid automobile is provided with a transmission and a differential gear, and said electric motor is provided between said transmission and said differential gear.

14. The auxiliary brake apparatus of a hybrid automobile according to claim 1, wherein said hybrid automobile is provided with a differential gear, and said electric motor is provided between said differential gear and a driving wheel of said hybrid automobile.

15. The auxiliary brake apparatus of a hybrid automobile according to claim 1, wherein said electric motor is coupled to a wheel of said hybrid automobile.

16. The auxiliary brake apparatus of a hybrid automobile according to claim 1, wherein said electric powered brake and said electric motor are connected to different batteries.

17. The auxiliary brake apparatus of a hybrid automobile according to claim 1, further comprising a notifying unit for notifying a driver of a failure when said failure occurs to said electric powered brake.

18. An auxiliary brake apparatus of a hybrid automobile, said hybrid automobile comprising:
- an engine capable of driving said hybrid automobile,
- an electric motor capable of driving said hybrid automobile,
- an electric powered brake for braking said hybrid automobile and
- a controller capable of controlling driving by said engine, driving by said electric motor and braking by said electric powered brake, said auxiliary brake apparatus comprising:
  - braking detecting means for detecting an operation of braking said hybrid automobile;
  - auxiliary brake means capable of braking said hybrid automobile by use of said electric motor, said electric motor being said auxiliarm brake electric motor; and
  - auxiliary brake control means capable of controlling said auxiliary brake means, said auxiliary brake control means controlling said auxiliary brake means to generate a counter torque in said electric motor to thereby brake said hybrid automobile in accordance with said operation of braking detected by said braking detecting means when said auxiliary brake control means determining that said electric powered brake fails.

* * * * *